July 19, 1949.　　　W. R. L'HUILLIER　　　2,476,553

FISHING LURE

Filed May 8, 1944

INVENTOR.
Wesley R. L'Huillier
BY
Stanley Lightfoot
ATTORNEY.

Patented July 19, 1949

2,476,553

UNITED STATES PATENT OFFICE 2,476,553

FISHING LURE

Wesley R. L'Huillier, Dearborn, Mich.

Application May 8, 1944, Serial No. 534,620

1 Claim. (Cl. 43—41)

This invention relates to fishing lures and has more especial reference to the use of live bait, such as small fish and minnows, which by their appearance, movements or other characteristics are attractive to fish.

The principal object of the invention is to provide a form of lure in which the bait may be preserved, preferably in a continued living and more or less animated state, and used over and over again, and in which the said live bait will be protected from damage by the fish being caught.

A further, and important, object is to provide for such protection of the bait in the lure in a manner which will render the said bait and its movements visible to the fish being sought; and more particularly to provide for the enclosure of the live bait in a transparent envelope forming the main mechanical part of the lure.

A still further object of the said invention is to provide in a device of the type referred to, a transparent envelope to receive live bait, means for attaching a fishing line to the said envelope, and means for also connecting hooks with said line or said envelope in such manner that the envelope will not be damaged by the action or weight of a fish caught on any of said hooks.

The invention also contemplates providing for the free flow of water through the transparent envelope to maintain the enclosed bait in good condition; and further contemplates provision for allowing certain parts of the live bait to project outwardly of the envelope, whereby said bait may be rendered more attractive to the fish being sought than if it were completely enclosed in the said envelope.

Still further objects or advantages additional or subsidiary to the aforesaid objects, or resulting from the construction or operation of the said invention as it may be carried into effect, will become apparent as the said invention is hereinafter further disclosed.

In carrying the said invention into effect, I may provide a transparent capsule or envelope with means for the introduction thereinto of live bait, such as a minnow, and the temporary detention of such bait therein, a connection at or towards one end of the envelope for a fishing line, and one or more hooks associated with the said envelope in such manner as to form a snare for fish attempting to reach the bait within the envelope. All of which is more particularly described and ascertained, by way of example, in and by the following specification, having reference to the accompanying drawing, wherein:

Similar characters of reference indicate similar parts in the several figures of the drawing.

Figures 1, 2, 3:
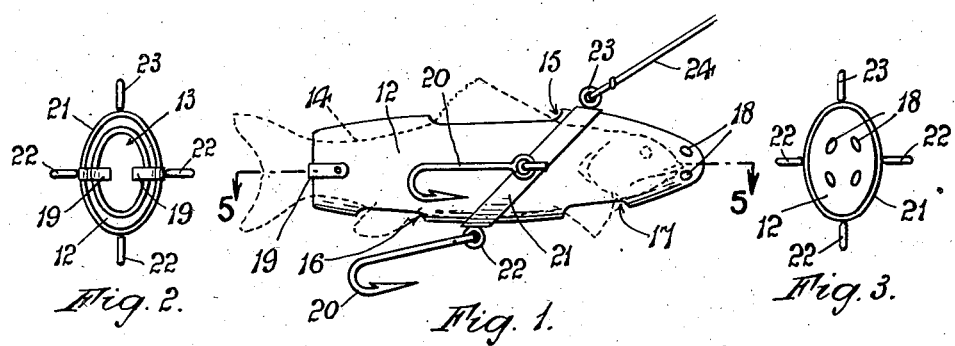
Figure 1 is a side elevation of a preferred form of my improved lure.
Figure 2 is a rear end elevation of the same.
Figure 3 is a front end elevation of the same.
Figures 4, 5:
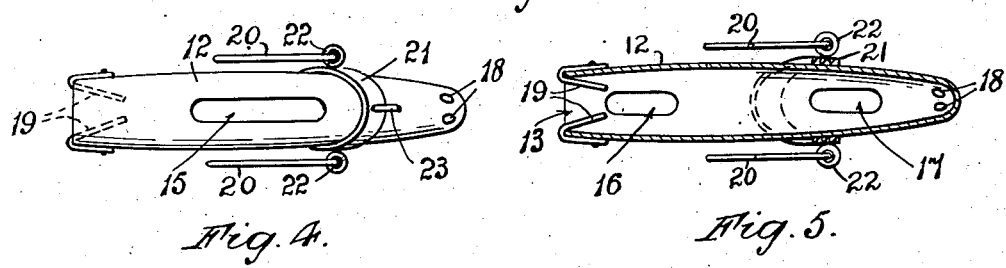
Figure 4 is a plan view of the same.
Figure 5 is a horizontal section taken on a plane indicated by the line 5—5 in Figure 1.

This type of lure is particularly attractive to pike, pickerel, muskellunge and also to perch, crappies, bluegills, sunfish, trout and so forth. It is intended to be used with small fish such as minnows as the live bait although, of course, it does not preclude the use of other suitable creatures or materials, either live or otherwise.

A hollow envelope or capsule 12 is shown which is preferably transparent and may be any of the well-known plastic materials; the said envelope is characterized by the fact that provision is made for part of the live bait to project therefrom in order that the natural movement of such parts, or the movement produced by the action of the water through which the lure is drawn, may serve to assist in the attraction of the fish being sought.

13 indicates a rear opening, through which the tail of a minnow 14 inserted into the envelope may project, as illustrated, and 15 is an opening on the top side of the said envelope through which the dorsal fin of the minnow may also project; 16 and 17 being openings on the underside of the envelope through which the anal and ventral fins, respectively, of the said minnows may project.

The front end of the envelope I prefer to perforate, as at 18 to facilitate the free flow of water through the envelope. To prevent the minnow from being washed out or otherwise freeing itself from the said envelope after its insertion thereinto. I may provide any suitable means as a detent, and in the drawing I have shown resilient fingers 19 extending inwardly of the open rear end of the said envelope and converging toward one another to engage the tail portion of the minnow, which fingers, however, may be spread apart to permit the eventual withdrawal of the minnow from the envelope when it is so desired.

Suitable hooks 20 are intended to be associated with or carried by the said envelope, as will be readily understood, and provision is made for the attachment of the fishing line thereto also in such relation as may be called for by the type of fishing being indulged in. As reinforcement for the envelope, and as a strain member for the hooks I show, in Figures 1 to 5, a band 21 of metal or other suitable material provided with rings 22 to which the hooks 20 are attached and a ring 23 on the top of the said band 21 to which the fishing line 24 is attached. In this case the band preferably encircles the said envelope at an angle as shown, so that the line connection is at the top somewhat rearward of the nose of the said envelope. This point of connection is usually desirable in midwater fishing, bottom fishing and "dibbling" for winter fish through the ice, as well as for many other forms of fishing.

Figures 6, 7:
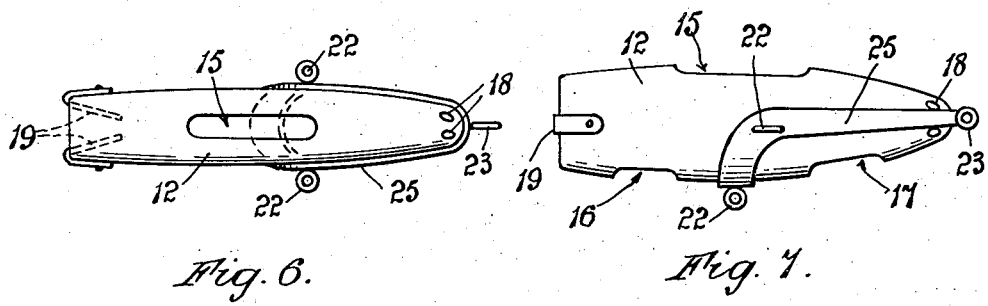
Figure 6 is a plan view of a slightly modified form of the device.
Figure 7 is a side elevation of the form shown in Figure 6.

For trolling, and similar types of fishing, where it is desirable to use a spinner or spoon ahead of the bait proper, or where it is otherwise desired that the bait be connected at the front end to the line, I may use a form of band 25 such as shown in Figures 6 and 7, extending from the nose of the said envelope 12 and beneath the underside of the said envelope, the line ring 23 being in this case attached to the extreme forward part of the said band.

This invention may be developed within the scope of the following claim without departing from the essential features of the said invention and it is desired that the specification and drawing be read as being merely illustrative of a practical manner of carrying the invention into effect and not in a strictly limiting sense.

What I claim is:

In a lure of the class described, a transparent envelope for receiving bait in the form of a live fish, said envelope being open at the rear end in order that the tail of such fish may project therefrom, said opening being greater than the girth of the fish to be received whereby said fish may be inserted therethrough, and resilient detent means on either side of said rear opening permitting insertion of the fish but resisting withdrawal thereof through said rear opening.

WESLEY R. L'HUILLIER.

REFERENCES CITED

The following references are of record in the file of this patent:

UNITED STATES PATENTS

| Number | Name | Date |
| --- | --- | --- |
| 556,494 | Dales | Mar. 17, 1896 |
| 573,572 | Dales | Dec. 22, 1896 |
| 1,003,962 | Henning | Sept. 19, 1911 |
| 1,470,842 | Hyams | Oct. 16, 1923 |
| 1,544,129 | Burt | June 30, 1925 |
| 1,814,450 | Nelson | 1931 |
| 1,870,273 | Willinger | 1932 |

FOREIGN PATENTS

| Number | Country | Date |
| --- | --- | --- |
| 21,576 | Great Britain | 1912 |